(12) United States Patent
Kulkarni et al.

(10) Patent No.: US 9,819,563 B2
(45) Date of Patent: Nov. 14, 2017

(54) FAILURE MANAGEMENT FOR ELECTRONIC TRANSACTIONS

(71) Applicant: Verizon Patent and Licensing Inc., Arlington, VA (US)

(72) Inventors: Shankar Anantrao Kulkarni, Bridgewater, NJ (US); Jeetendra Pradhan, Hackettstown, NJ (US); Deepa Anandan, Randolph, NJ (US); Venugopal Godavarty, North Brunswick, NJ (US); Hermes Raymond Munian, Stroudsburg, PA (US); Mandar Ramchandra Hawaldar, Piscataway, NJ (US); Rohit Natu, Johns Creek, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 216 days.

(21) Appl. No.: 14/577,975

(22) Filed: Dec. 19, 2014

(65) Prior Publication Data

US 2016/0179607 A1 Jun. 23, 2016

(51) Int. Cl.
| | |
|---|---|
| *H04L 12/26* | (2006.01) |
| *G06F 11/07* | (2006.01) |
| *H04L 29/08* | (2006.01) |
| *G06F 11/14* | (2006.01) |
| *G06F 11/30* | (2006.01) |

(52) U.S. Cl.
CPC ...... *H04L 43/0817* (2013.01); *G06F 11/0709* (2013.01); *G06F 11/0751* (2013.01); *G06F 11/0784* (2013.01); *G06F 11/0787* (2013.01); *G06F 11/14* (2013.01); *G06F 11/30* (2013.01); *H04L 67/28* (2013.01); *G06F 11/1443* (2013.01); *G06F 11/3006* (2013.01); *G06F 11/3055* (2013.01)

(58) Field of Classification Search
CPC ............. G06F 11/3476; G06F 11/3414; G06F 11/3438; G06F 11/3495
See application file for complete search history.

(56) References Cited

U.S. PATENT DOCUMENTS

| | | | | |
|---|---|---|---|---|
| 2001/0032254 | A1* | 10/2001 | Hawkins | ............. G06F 17/3089 709/219 |
| 2002/0062377 | A1* | 5/2002 | Hillman | .................. H04L 29/06 709/227 |
| 2006/0230121 | A1* | 10/2006 | Arndt | ................ G06F 17/30575 709/217 |
| 2007/0027885 | A1* | 2/2007 | Oshida | .................... H04L 69/40 |

(Continued)

*Primary Examiner* — Jigar Patel

(57) ABSTRACT

A system and method are provided for failure management for electronic transactions. An access request is received at a first server and from a client device, for a second server. The first server determines whether the second server is functional. If the second server is non-functional, the access request is stored in a storage associated with the first server. The second server is monitored until becoming functional. During the monitoring, a status request from the client device may be received and responsive to the status request, a status update is sent to the client device. Upon determining the second server is functional, the access request is sent to the second server, a response to the access request is received from the second server, and the response is sent to the client device.

19 Claims, 13 Drawing Sheets

(56) References Cited

U.S. PATENT DOCUMENTS

| | | | |
|---|---|---|---|
| 2013/0163404 A1* | 6/2013 | Sun | H04M 3/42195 370/216 |
| 2014/0222974 A1* | 8/2014 | Liu | H04W 80/12 709/219 |
| 2015/0019671 A1* | 1/2015 | Yasuda | H04L 43/0805 709/208 |

* cited by examiner

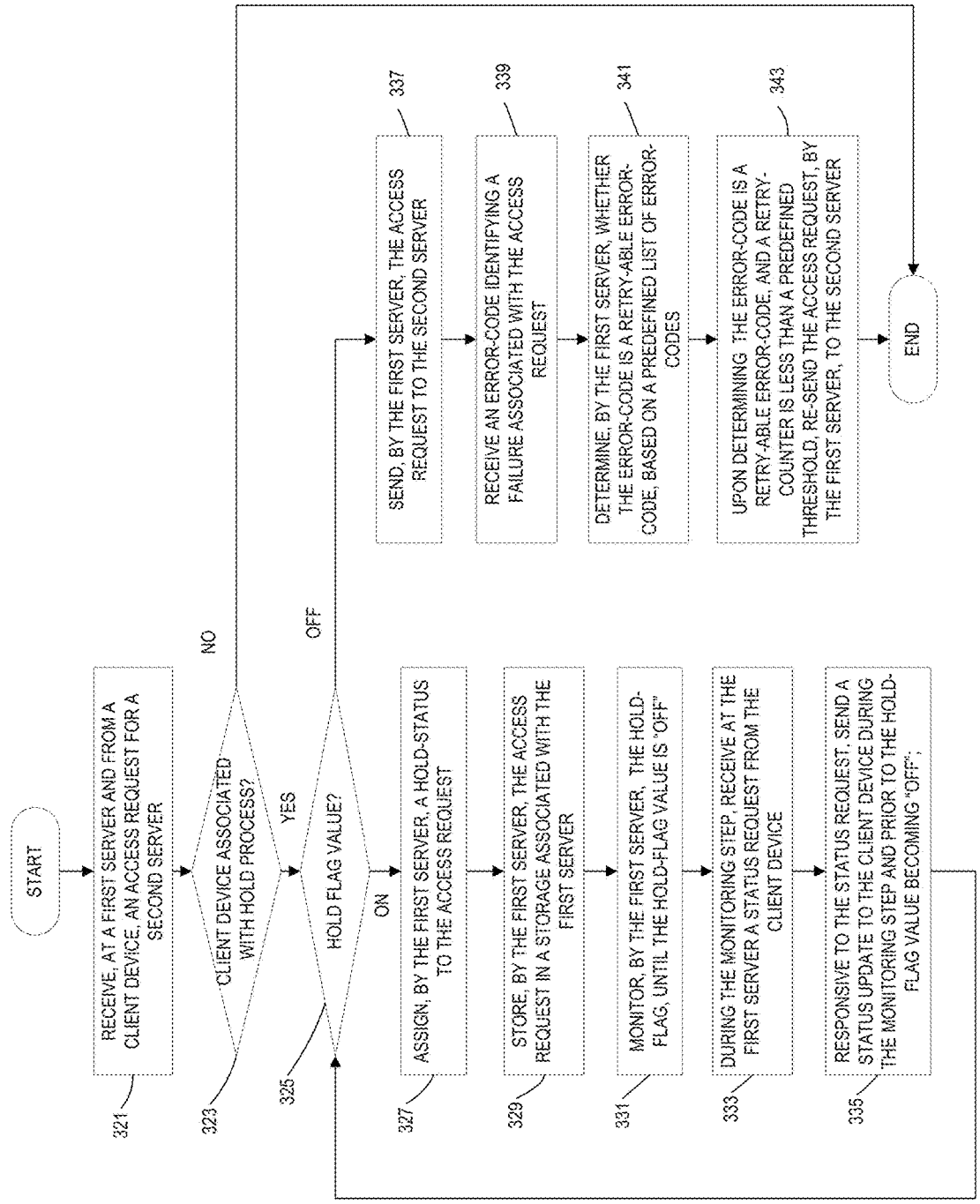

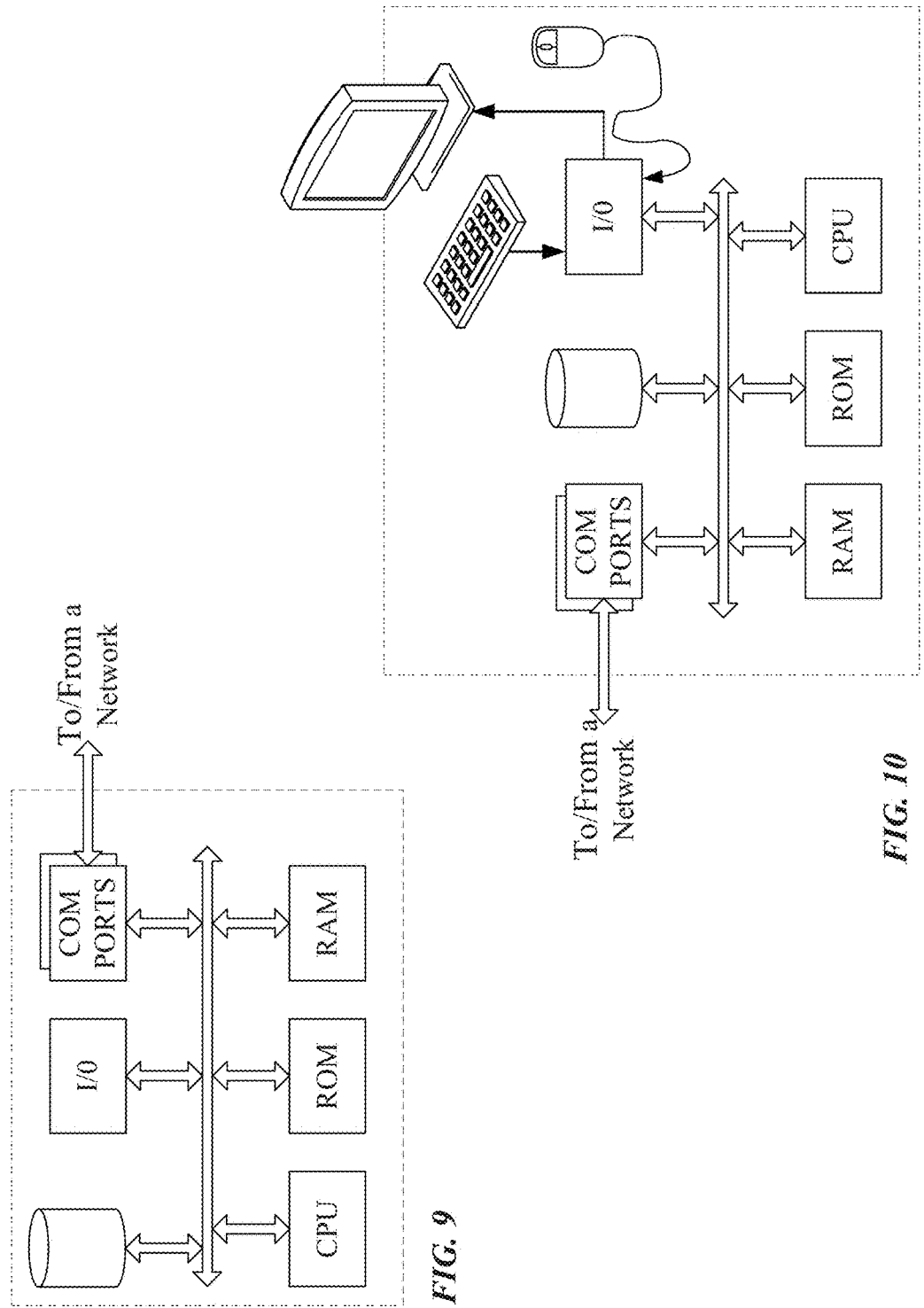

FAILURE MANAGEMENT FOR ELECTRONIC TRANSACTIONS

BACKGROUND

Various technologies enable wireless and wired computing devices and/or systems to communicate with other devices and/or systems for performing different kinds of electronic transactions. Machine to Machine (M2M) communications and Business to Business (B2B) communications are examples of this type of communication among computing devices and/or systems. Industries and businesses benefit from this type of communication and related transactions. However, failure management for the diverse transactions among computing devices and/or systems with different configurations is a difficult task. The transaction failures can lead to poor client experience and loss of revenue. The failures can also severely impact communication flow between entities on both ends of the communication (e.g., clients on one end and service providers on the other). Therefore, a need exists for failure management for electronic transactions to reduce failure impact on the communicating entities.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 3A-3B are exemplary processes for providing failure management for electronic transactions.

FIG. 9 is a simplified functional block diagram of an exemplary computer that may be configured as a host or server.

FIG. 10 is a simplified functional block diagram of an exemplary personal computer or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

While the number and variety of services provided to clients by various service provider systems increase, communication among such systems is becoming necessary, to provide a combined service to the clients. For example, a server that provides building security services to clients such as, for example, home and business owners may need to communicate with a network communication provider and provide its security services to its clients via the network provided by the network communication provider. The security provider system and the network provider system may be organized and managed by different entities and therefore may have different configurations such as, for example, device types, operating systems, hardware and software platforms, etc. Intermediary platforms such as integration platforms can be used to orchestrate communication among the service providers (e.g., the security service provider as a first server, and the network provider as a second server, in the above example). An integration platform can provide an environment which enables service providers and their clients to communicate seamlessly without having to convert data formats for compatibility reasons. An integration platform may consist of components located in the same location, or distributed in various locations throughout a communication network. The integration platform may also include several clusters each handling part of the communication traffic through the integration platform.

The integration platform can receive a request from a client of a first server (e.g., security service provider) to use the services provided by a second server (e.g. network provider) and communicating the request to the second server. However, a failure at the integrating platform, or a failure at the second server may interrupt the communication process as described. In such cases, the integration platform may issue an error notification to the client indicating that the service is not available. Various types of failures such as, for example, failure in any device or application, any scheduled or unscheduled maintenance activities, etc. may occur and interrupt the processing of the request. A failure may cause a delay in the process of the request and this can affect client satisfaction, wait time and communication efficiency in general. Therefore, a need exists for failure management for electronic transactions to reduce failure impact on the communicating entities.

Figure 1:
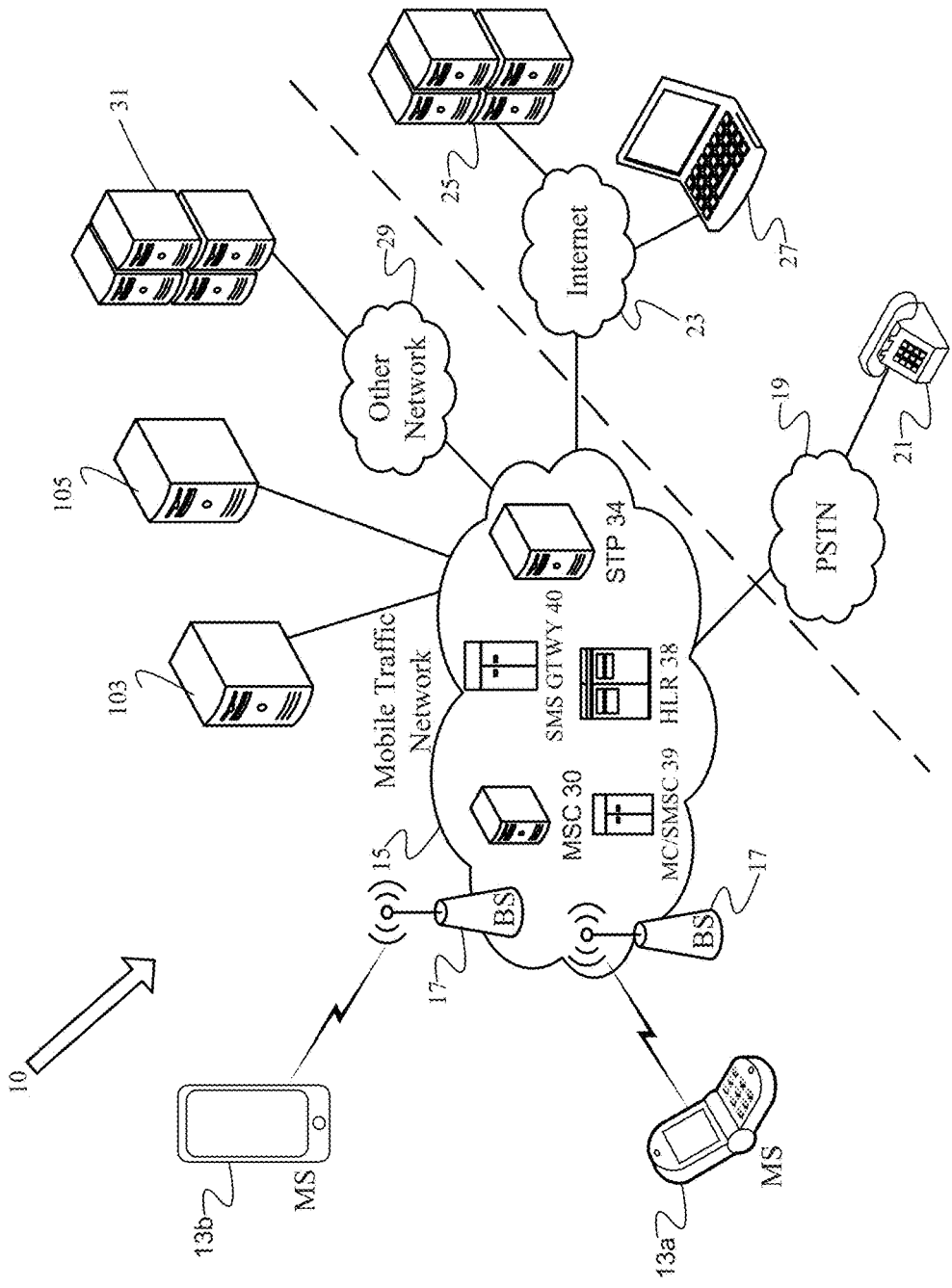
FIG. 1 is a high-level functional block diagram of an exemplary network that provides various communications for mobile devices and supports an example of the failure management for electronic transactions, according to one implementation.

Reference now is made in detail to the examples illustrated in the accompanying drawings and discussed below. FIG. 1 is a high-level functional block diagram of an exemplary network 10 that provides various communications for mobile devices and supports an example of the failure management for electronic transactions by a failure management platform 103, according to one implementation. The failure management platform 103 can provide failure management for integration services provided by integration server 105 for integrating services provided by the application servers 31 or 25 to mobile devices 13a and 13b and the user terminals 27. The example shows simply two mobile devices 13a and 13b as well as a mobile communication network 15. The stations 13a and 13b are examples of mobile devices that may be used for accessing the services provided by the application servers 31 or 25 and the failure management services provided by the failure management platform 103. The application servers 31, 25 may be managed by the integration server 105. The failure management platform 103 can be located within the integration server 105 or as a separate platform anywhere throughout the mobile communication network 10 and communicate with the integration server 105 and with the application servers 25 and 31 via the communication network 15.

Although two mobile devices are shown, the network provides similar communications for other users as well as for mobile devices/users that may not participate in the services. The network 15 provides mobile wireless communications services to those stations as well as to other mobile devices (not shown), for example, via a number of base stations (BSs) 17. The present techniques may be implemented in any of a variety of available mobile networks 15 and/or on any type of mobile device compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless Internet Protocol (IP) network standard or the Evolution Data Optimized (EVDO) standard, the Global System for Mobile (GSM) communication standard, a time division multiple access (TDMA) standard or other standards used for public mobile wireless communications. The mobile devices 13a and 13b may be capable of voice telephone communications through the network 15, and for accessing applications and services provided by application servers 31 and 25, the integration sever 105 and the failure management platform 103. The exemplary devices 13a and 13b are capable of data communications through the particular type of network 15 (and the users thereof typically will have subscribed to data service through the network).

The network 15 allows users of the mobile devices such as 13a and 13b (and other mobile devices not shown) to initiate and receive telephone calls and messages to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile devices 13a and 13b via the Internet 23 may be with devices like those shown at 25 and 27 as well as with a variety of other types of devices or systems capable of data communications through various interconnected networks. The mobile devices 13a and 13b of users also can receive and execute applications written in various programming languages, as discussed in more detail below.

Mobile devices 13a and 13b can take the form of portable handsets, smart-phones or personal digital assistants, although they may be implemented in other form factors. Program applications, provided by the application server 25 or 31 to the mobile devices 13a, 13b and to the user terminals 27 and services provided by the integration server 105 and the failure management platform 103 can be configured to execute on many different types of mobile devices 13a and 13b and user terminals 27. For example, a mobile device application can be written to execute on a binary runtime environment for mobile (BREW-based) mobile device, a Windows Mobile based mobile device, Android, I-Phone, Java Mobile, or RIM based mobile device such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile devices 13a and 13b, can include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 can include a base transceiver system (BTS), which can communicate via an antennae system at the site of base station and over the airlink with one or more of the mobile devices 13a and 13b, when the mobile devices are within range. Each base station can include a BTS coupled to several antennae mounted on a radio tower within a coverage area often referred to as a "cell." The BTS is the part of the radio network that sends and receives Radio Frequency (RF) signals to/from the mobile devices 13a and 13b that are served by the base station 17.

The radio access networks can also include a traffic network represented generally by the cloud at 15, which carries the user communications and data for the mobile devices 13a and 13b between the base stations 17 and other elements with or through which the mobile devices communicate. In some examples, the mobile traffic network 15 includes network elements that support mobile station media content transfer services such as mobile switching centers (MSCs) 30 and signal transfer points (STP) 34. The network can also include other elements that support functionality other than device-to-device media transfer services such as messaging service messages and voice communications. Examples of other network elements that may be used in support of messaging service message communications include, but are not limited to, message centers (MCs) 39, home location registries (HLRs) 38, simple messaging service (SMS) gateway 40, and other network elements such as wireless internet gateways (WIGs), and visitor location registers (VLRs) (not shown). Other individual elements such as switches and/or routers forming the traffic network 15 are omitted here for simplicity. It will be understood that the various network elements can communicate with each other and other aspects of the mobile communications network 10 and other networks (e.g., the public switched telephone network (PSTN) and the Internet) either directly or indirectly.

The mobile switching center (MSC) 30 is responsible for managing communications between the mobile device and the other elements of the network 10. In addition, the MSC 30 is responsible for handling voice calls and messaging service message requests as well as other services (such as conference calls, FAX and circuit switched data, messaging service communications, Internet access, etc.). The MSC 30 sets up and releases the end-to-end connection or session, and handles mobility and hand-over requirements during the call. The MSC 30 also routes messaging service messages to/from the mobile devices 13a or 13b, typically from/to an appropriate MC 39. The MSC 30 is sometimes referred to as a "switch." The MSC 30 manages the cell sites, the voice trunks, voicemail, and SS7 links.

The message center (MC) 39, in some examples, allows messaging service messages to be exchanged between mobile telephones and other networks. For SMS messaging, for example, the MC 39 receives packet communications containing text messages from originating mobile devices and forwards the messages via the signaling resources and the signaling channels to the appropriate destination mobile devices. The MC 39 may receive messages from external devices for similar delivery to mobile devices, and the MC 39 may receive similar messages from mobile device 13a or 13b and forward them to servers or terminal devices, in either case, via an Internet Protocol (IP) packet data network.

In some examples, the MC 39 can also be considered or include functionality that may be considered that of a Short Messaging Service Message Center (SMSC) or a Message Register (MR). Wireless carriers developed the short message service (SMS) to transmit text messages for display on the mobile devices. In many existing network architectures, the SMS traffic uses the signaling portion of the network 15 to carry message traffic between SMSC 39 and the mobile devices. The SMSC 39 supports mobile device to mobile device delivery of text messages. However, the SMSC 39 also supports communication of messages between the mobile devices and devices coupled to other networks. For example, the SMSC 39 may receive incoming IP message packets from the Internet 23 for delivery via the network 15, one of the base stations 17 and a signaling channel over the air link to a destination mobile device. For this later type of SMS related communications, the network 10 also includes one or more SMS gateways 40.

In other examples, the MC 39 includes functionality related to the Enhanced Messaging Service (EMS) or Multimedia Messaging service (MMS). An EMS message has special text formatting (e.g., such as bold or italic), animations, pictures, icons, sound effects and special ring tones. MMS messages support the sending and receiving of multimedia messages (e.g., images, audio, video and their combinations) to (or from) MMS-enabled mobile devices. In some examples, the MC 39 is considered in whole or in part a multimedia messaging service center (MMSC).

Although a single MC 39 is shown, a network 10 has geographically dispersed MCs 39. The MCs 39 includes destination routing tables (DRTs). In essence the DRTs are databases within the MCs 39. A DRT contains a list of the MDNs which are associated with the various MCs 39. For example, a first MDN is associated with a MC 39 in Minnesota while a second MDN is associated with a MC 39 in Virginia. The DRTs are used to determine which MC 39 should attempt to deliver an incoming messaging service message to the destination MDN. For example, if a user associated with the MC in Minnesota sends an SMS to a user associated with the MC 39 in Virginia, the Minnesota MC 39 sends the SMS to the Virginia MC 39 for delivery to the destination MDN. The communication among the MCs 39 occurs using known protocols such SMPP and the like.

The HLR 38, in some examples, stores a subscriber profile for each of the wireless subscribers and their associated mobile devices 13a and 13b. The HLR 38 may reside in an MSC 30 or in a centralized service control point that communicates with the MSC(s) 30 via an out-of-band signaling system such as an SS7 network. The HLR 38 stores for each mobile subscriber the subscriber's mobile directory number (MDN), the mobile identification number (MIN), and information specifying the wireless services subscribed to by the mobile subscriber, such as numeric paging or text-based paging, data communication services, etc. Of course, the HLR 38 can also be a stand-alone device. The HLR 38 also tracks the current point of attachment of the mobile device to the network, e.g., the identification of the MSC 30 with which the mobile device is currently registered to receive service.

The visitor location register (VLR) (not shown) is, in some examples, a temporary database of the mobile devices that have roamed into the particular area which it serves. The VLRs for a region often are implemented in or in association with a MSC 30. Each base station 17 in the network is served by a single VLR, hence a subscriber cannot be present in more than one VLR at a time. The data stored in the VLR has either been received from the HLR 38, or collected from the mobile device.

The SMS gateway 40 provides functionality to transport messaging service messages to other mobile communication networks and also receive messaging service messages from other networks. The SMS gateway 40 may support communications using the SMPP protocol. SMS gateways 40 can be Short Message Peer-to-Peer gateways used to connect the wireless communication network (such as an Internal Protocol IP network on the left of the SMS Gateway 40 in FIG. 1) to another network (such as a public Internet network on the right of the SMS Gateway 40 in FIG. 1). The SMS Gateway 40 allows the MC 39 to receive and send messages in IP packet format. The SMS Gateway 40 is an entity within the wireless network 10 that acts as an intermediary between the wireless service provider network and other networks. For example, the SMS Gateway 40 converts messages in protocol(s) used by other applications and devices, e.g. Extensible Markup Language (XML), Hypertext Mail Protocol (HTMP), etc., to and from the short SMPP protocol. The SMPP messages may ride on IP transport, e.g., between the SMS Gateway 40 and the MC 39.

In addition, the traffic network portion 15 of the mobile communications network 10 connects to a private data network 29. The private data network 29 connects to the traffic network portion 15 via a gateway (not shown). The gateway provides protocol conversions between the protocols used by the traffic network 15 and the protocols used by the private data network 29.

The private data network 29 is in communication with various auxiliary services servers, e.g., such as those providing additional services to the users of the network 10, and/or to operations support personnel of the service provider or carrier that operates the network 10. In an aspect private data network 29 is in communication with the failure management platform 103, with the integration server 105, and application servers 25 and 31.

In an aspect, the integration server 105 receives a request from a mobile device 13a or 13b or from a user terminal 27 for accessing integrated services provided by the application servers 31 and 25. The integration server 105 may receive the request via the failure management platform 103. For example, the application server 31 may be a private network provider providing network communication to the users of an application server 25 that provides a service such as, for example, a home security service. The integration server 105 can receive a request from a mobile device 13a or 13b or a user terminal 27, for using an integrated service of the servers 31 and 25 provided by the integration server 105. The request can be an online query received from a mobile device 13a or 13b or a user terminal 27, for example, by activating an application on the mobile device 13a or 13b or user terminal 27.

The failure management platform 103 can analyze the request received from the mobile device 13a or 13b or the user terminal 27, prior to communicating the request to the application servers 31 or 25. The analysis can determine whether the request is a valid request. A valid request can be a request that is received from a registered client at the application servers 31 or 25 and includes elements necessary for processing the request. Each client of the application server 31 or 25 can have a profile at the integration server 105 and can be assigned an identification code by the integration server 105 for accessing an integrated service of application servers 31 and 25. The client profile may include information associated with the client such as, for example, client type, type of services covered under the client account, etc. A request can be determined as invalid, for example, if it includes request for services that are not covered under the requesting user's profile. In addition, a request from a registered client can be translated into a set of processing steps at the integration server 105. The failure management platform 103 may also analyze the request to determine the request type and to determine whether the requesting client's account allows the request type.

The failure management platform 103 can also determine a device type of the mobile device 13*a* or 13*b* or the user terminal 27, used by the client for sending the request and determine whether the device type is a compatible device with services provided by the application servers 31 and 25.

Upon validation of the client, the client device, and the client's request, the failure management platform 103 can send a notification to the client via the mobile device 13*a* or 13*b* or the user terminal 27 indicating that the request was received and is being processed. Subsequently, the integration server 105 or the failure management platform 103 can send the request to an application server 31 or 25 for processing.

However, a failure at the integrating server 105, or a failure at any of the servers 31 or 25 may interrupt the communication process for accessing the integrated service by the mobile device 13*a* or 13*b* or the user terminal 27, as described above. For example, the request may be determined by the integration server 105 as invalid, the integration server 105 may be down, the application server 31 or 25 may be down, etc. The failure management platform 103 can monitor a status of the integration server 105 or an application server 31 or 25, for example, by sending status request queries to the integration server 105 or the application servers 31 or 25 periodically and receive status updates. In such cases where no status update is received from a integration server 105 or an application server 31 or 25 or a status including an error status is received at the failure management platform 103, the failure management platform 103 can issue an error notification and send the notification to the mobile device 13*a* or 13*b* or the user terminal 27 of the client indicating that the request is invalid and needs to be revised, the integration server 105 is not available, or any of the application servers 31 or 25 are not available. Various types of failures such as, for example, failure in any device or application, or any scheduled or unscheduled maintenance activities may occur and interrupt the processing of the request. A failure may cause a delay in the process of the request and this can affect client satisfaction, increase the wait time and decrease communication efficiency in general.

In some aspects, upon occurrence of a failure at the integrating server 105, or a failure at any of the servers 31 or 25, the failure management platform 103 can monitor the failure status as discussed above, for example, by sending status update requests, until the issue causing the failure is solved and the failed services are reactivated. Upon the failed services becoming functional, the failure management platform 103 can resend the failed requests due to the failure to the application server 31 or 25 for processing. In some aspects, the failure management platform 103 can resend the request multiple times until the request is processed and the result is returned to the failure management platform 103, for example via the integration server 105. The failure management platform 103 can notify the client via the mobile device 13*a* or 13*b* or the user terminal 27 that the request is processed and the requested service is functional.

In some aspects, the retry mechanism for resending the request by the failure management platform 103 may include setting a flag value, upon occurrence of a failure, indicating that the failure management platform 103 is starting the monitoring process. In such cases, the integration server 105 may not sent error messages or failure notices associated with the failure to the client and redirect the messages and notices to the failure management platform 103 instead. The failure management platform 103 can communicate with the failed server until the failure is resolved and once the server is functional, the failure management platform 103 can send a notification to the mobile device 13*a* or 13*b* or the user terminal 27 of the client informing the client that the failed server is available and that the client can resend the request. In some other instances, the failure management platform 103 can store the request in a memory associated with the failure management platform 103 and monitor the failed server 105, 31, or 25 until the failed server is functional. Once the failed server is functional, the failure management platform 103 can resends the stored request to the integration server 105 or the application server 31 or 25 for processing without the client having to resend the request. The failure management platform 103 can also send a notification to the mobile device 13*a* or 13*b* or the user terminal 27 of the client informing the client that the failed server is functional and that the request was resent to the server by the failure management platform 103. Upon the failed server becoming functional, the failure management platform 103 can reset the flag value to indicate that the client can now communicate normally with the failed integration server 105 or the application server 31 or 25.

The carrier also operates a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private network. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31.

A mobile device 13*a* or 13*b* communicates over the air with a base station 17 and through the traffic network 15 for various voice and data communications, e.g. through the Internet 23 with a server 25 and/or with application servers 31. To insure that the application service offered by application servers 25 or 31 is available to only authorized devices/users, the provider of the application service may also deploy an authentication service. In addition, the provider of the application service may also deploy authentication services. The failure management platform 103 can be a separate physical server as shown, or the failure management platform 103 can be implemented as another program module running on the same hardware platform as the integration server 105 or application server 31 or 25. When the integration server 105 or the application server (servers 25 or 31 in our example) receives a service request from a client application on a mobile device 13a or 13b or a user terminal 27, the integration server 105 or the application server 25 or 31 provides appropriate information (e.g., server status update, query response status update, etc.) to the failure management platform 103. The failure management platform 103 uses the information provided by the integration server 105 or the application server 25 or 31 to communicate with the mobile device 13a or 13b or user terminal 27, for example, by informing a user that their request is being processed, or the server is not able to process the query at this time due to error, etc. Upon successful completion of the failure management process, the failure management platform 103 provides failure reports to the application providers (e.g., application servers 31 or 25) or the integration server 105 via data communication through the various communication elements (e.g. 29, 15 and 17) of the network 10. The services provided by the integration server 105 and the failure management platform 103 may be provided via the server 31 or 25, if there is an appropriate arrangement between the carrier and the operator of server 31 or 25, by a program on the server 31 or 25 or via a separate server (not shown) connected to the Internet 23 or the network 29.

Servers such as 25 and 31 may provide any of a variety of common application or service functions in support of or in addition to an application program running on the mobile device 13a, 13b, or a user terminal 27. However, for purposes of further discussion, we will focus on functions thereof in support of the failure management service. For a given service, including the failure management service, an application program within the mobile device may be considered as a 'client application' and the programming at 103, 105, 25 or 31 may be considered as the 'server' application for the particular service.

Figure 2:
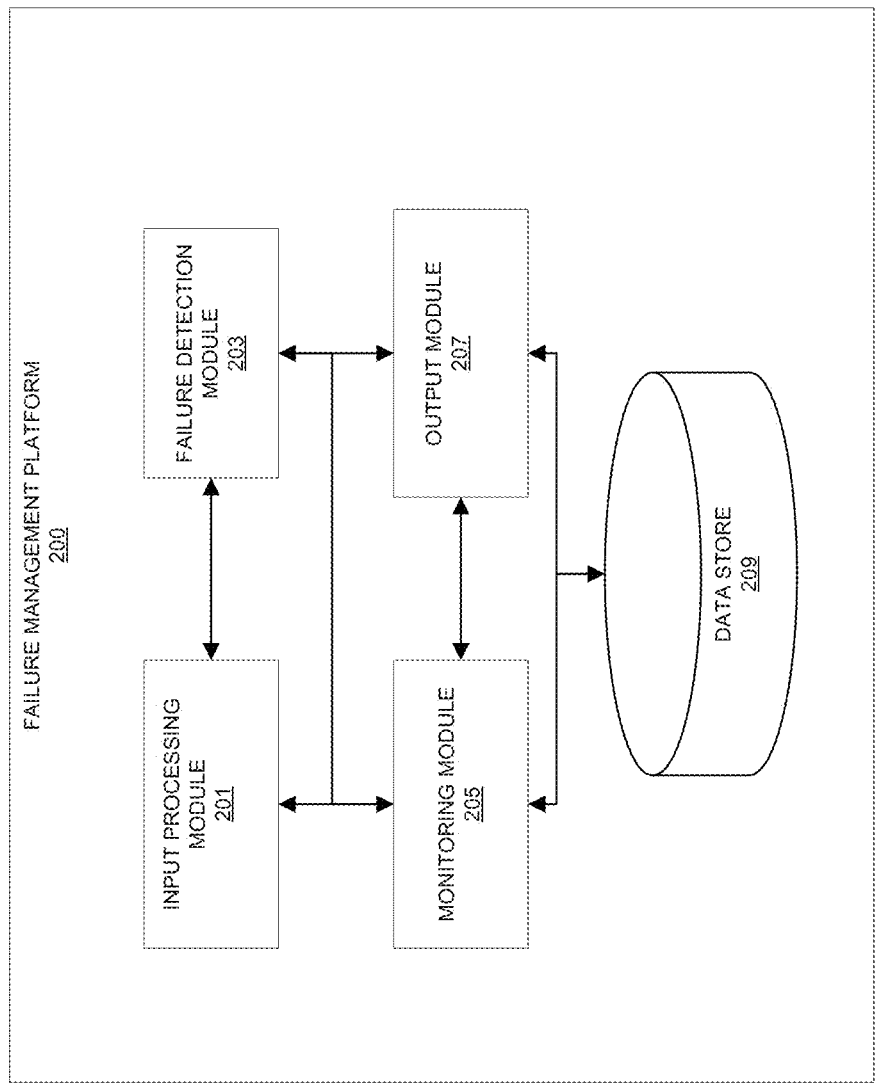
FIG. 2 is a schematic illustration of a failure management platform, according to an implementation.

FIG. 2 is a schematic illustration of a failure management platform, according to an implementation. The failure management platform 200 can be similar to the failure management platform 103 of FIG. 1. As previously discussed, the failure management platform 200 can be located anywhere throughout the mobile communication network 10. The failure management platform 200 can provide failure management for an integration server 105 and application server 31 or 25, where the application servers 31 or 25 provide services to mobile devices 13a or 13b or to user terminals 27 via the integration server 105. The failure management platform 200 can receive a server request from a mobile device 13a or 13b or user terminal 27, determine status of the integration server 105 and the application servers 31 or 25 and send the request to the integration server 105 and/or the application servers 31 or 25, if the integration server 105 and/or the application servers 31 or 25 are functional. If any of the integration server 105 and/or the application servers 31 or 25 is non-functional, the failure management platform 200 can monitor the status until the server becomes functional before sending the request to the server. In some aspects, the failure management platform 200 or one or more modules of the failure management platform 200 can be located within a mobile device 13a or 13b or a user terminal 27. As shown in FIG. 2, the failure management platform 200 may include an input processing module 201, a failure detection module 203, a monitoring module 205, an output module 207, and a data store 209. As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

The failure management platform 200 can provide failure management to a mobile device 13a and 13b or a user terminal 27 as an additional service to applications provided by the application servers 31 and 25 for the mobile devices 13a and 13b and the user terminals 27. In some instances, the input processing module 201 receives an access request for an application server 31 or 25 from a mobile device 13a or 13b or a user terminal 27. Responsive to receiving the access request, the failure detection module 203 determines whether the application server 31 or 25 is functional. If the failure detection module 203 determines that the application server 31 or 25 is non-functional, the failure detection module 203 stores the access request in data store 209 and sends a failure notification to the monitoring module 205. The monitoring module 205 monitors the application server 31 or 25 until the application server 31 or 25 becomes functional. For example, the monitoring module 205 may monitor the application server 31 or 25 by sending the stored request to the application server 31 or 25 in predefined time intervals until a response to the request is received from the application server 31 or 25.

In some aspects, the input processing module 201 receives a status request from the mobile device 13a or 13b or the user terminal 27 during the monitoring step while the monitoring module 205 is monitoring the application server 31 or 25. Responsive to the status request from the mobile device 13a or 13b or the user terminal 27, the output module 207 sends status update (e.g., a message indicating occurrence of a failure) to the mobile device 13a or 13b or user terminal 27 during the monitoring step and prior to the application server 31 or 25 becoming functional. In some instances, upon the determination by the failure detection module 203 that the application server 31 or 25 is non-functional, the output module 207 may automatically send a status update to the mobile device 13a or 13b or the user terminal 27 without a status request being received from the mobile device 13a or 13b or the user terminal 27.

Upon determining by the monitoring module 205 that the application server 31 or 25 is functional, the output module 207 can send the access request, stored in data store 209, to the application server 31 or 25.

In response to sending the access request to the application server 31 or 25, the input processing module 201 may receive a response to the access request from the application server 31 or 25. Upon receiving the response, the output device 207 sends the response to the mobile device 13a or 13b or user terminal 27.

The failure detection module 203 may not store the request in data store 209. In such instances, upon determining, by the monitoring module 25, that the application server 31 or 25 is functional, the output module 207 can send a message to mobile device 13a or 13b or user terminal 27 informing the client that the application server 31 or 25 is functional and requesting the client to resend the request.

In some instances, the mobile device 13a or 13b or the user terminal 27 may be associated with a hold process by the failure management platform 200. In such instances upon receiving an access request from the mobile device 13a or 13b or user terminal 27 for an application server 31 or 25, the failure management platform 200 determines a hold-flag value associated with the application server 31 or 25. For example, if the application server 31 or 25 is down for an overhaul or maintenance procedure, the administrators of the application server 31 or 25 can set the hold-flag value to "On", to put on hold any requests for the application server 31 or 25. Once the maintenance is completed, the administrators may set the hold-flag value to "Off".

Upon determining the hold-flag value is "On", the failure detection module 203 assigns a hold-status to the access request, stores the access request in data store 209 and sends a failure notification to the monitoring module 205, as described above. The monitoring module 205 monitors the hold-flag of the application server 31 or 25 until the hold-flag value is "Off". Upon determining, by the monitoring module 205, that the hold-flag value of the application server 31 or 25 is "Off", the output module 207 can send the access request, stored in data store 209, to the application server 31 or 25.

In response to sending the access request to the application server 31 or 25, the input processing module 201 may receive an error-code identifying a failure associated with the access request. Upon receiving the error-code, the failure detection module 203 determines whether the error-code is a retry-able error-code, based on a predefined list of error-codes. For example, the predefined list of error-codes may be stored in data store 209 and the failure detection module 203 may retrieve the list from data store 209. Upon determining, by the failure detection module 203, that the error-code is a retry-able error-code, the output module 207 can re-send the access request, stored in data store 209, to the application server 31 or 25.

The output module 207 may use a retry-counter value to count a number of times the access request is re-sent to the application server 31 or 25. The output module 207 may store the retry-counter in data store 209. The output module 207 may check a current value of the retry-counter prior to resending the access request to the application server 31 or 25 and re-send the request if the retry-counter value is less than a predefined threshold. In such instances, if the value of the retry-counter is greater than the predefined threshold, the output module 207 may send a message to the mobile device 13*a* or 13*b* or user terminal 27 informing the client that, for example, the request cannot be processed at this time and that the user can retry sending the request at a later time.

Figure 3A:
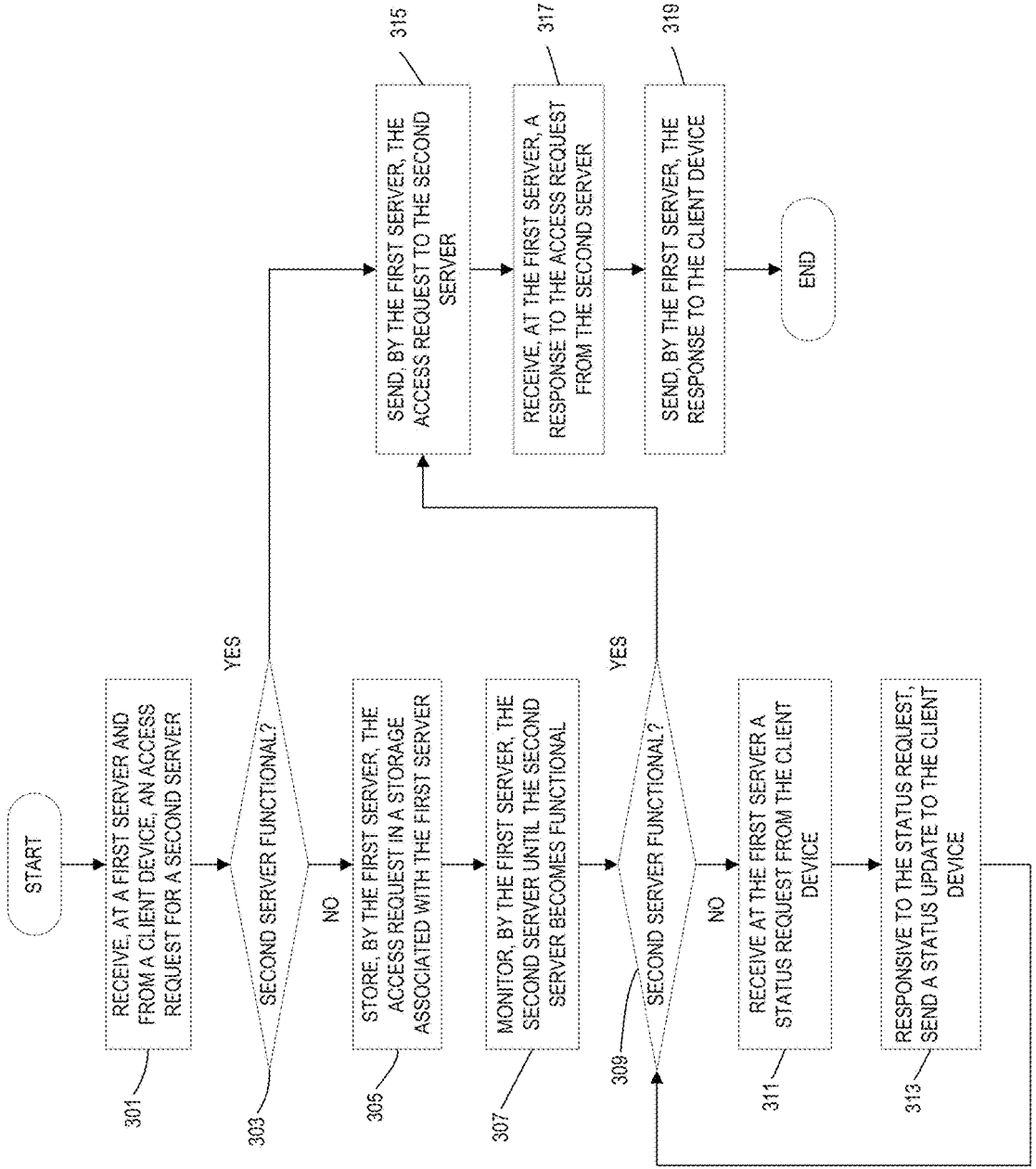

FIGS. 3A-3B are exemplary processes for providing failure management for electronic transactions. Although FIGS. 3A-3B is described with reference to FIGS. 1 and 2, the subject technology is not limited to such and can apply to other computing devices and systems.

FIG. 3A is an exemplary process for monitoring a failed server by the failure management server until the failed server becomes available. At block 301, the input processing module 301, of the failure management platform 200 of FIG. 2, receives an access request for an application server 31 or 25 from a mobile device 13*a* or 13*b* or a user terminal 27. Responsive to receiving the access request at the input processing module 201, at block 303, the failure detection module 203 determines whether the integration server 105 and application server 31 or 25 are functional. The failure detection module 203 may communicate with an integration server 105, via the communication network 15 of FIG. 1, to determine the functionality of the application server 31 or 25. For example, an integration server 105 may process incoming transactions associated with application servers 31 or 25 and provide an acknowledgement to the client in the form of a reference number. The integration server 105 may also enable the clients to leverage one or more status checks of the integration server 105 associated with the application servers 31 or 35 to identify the status of a transaction. Status of a transaction represents either a success or a failure of the transaction. A transaction may fail due to various reasons. For example, the request may have a validation error for not containing required information to fulfill the request. Other failures may occur when there are issues with the integration server 105 or application servers 31 or 25. The issues may include: servers are under maintenance for a duration of time (planned downtimes), servers are down due to hardware or software glitches for a duration of time (unplanned), servers are not returning correct data, etc.

In various instances, the failure management platform 200 can be a backend server or a frontend server. A backend failure management platform 200 can process failures such as connectivity failures and application failures. A connectivity failure may occur when the failure management platform 200 is unable to communicate with application servers 31 or 25, while an application failure may occur when an application server 31 or 25 returns a failure notification to the failure management platform 200 indicating that a retry-able failure has occurred. A frontend failure management platform 200 can process failures such as planned downtime failures, unplanned downtime failures and retry-able failures. A planned downtime failure may occur when the application server 31 or 25 is scheduled to be unavailable for certain duration of time, for example, due to maintenance activities. An unplanned downtime failure may occur when the application server 31 or 25 returns a failure notification due to an unexpected failure. The retry-able failure occurs when the application server 31 or 25 return a failure notification indicating a failure due to a temporary unavailability of part of the resources of the application server 31 or 25.

Upon determining, at block 303, that either of the integration server 105 or the application server 31 or 25 is non-functional, at block 305 the failure detection module 203 stores the access request in data store 209 of the failure management platform 200. At block 307, the monitoring module 205 starts monitoring the integration server 105 or the application server 31 or 25 until the second server becomes functional. For as long as the non-functional integration server 105 or the application server 31 or 25 remains non-functional, the monitoring module 205 continues to monitor the non-functional server. At block 309, the failure detection module 203 determines whether the non-functional server has become functional. If the server is still non-functional, at block 311 the input processing module 201 receives a status request from the mobile device 13*a* or 13*b* or user terminal 27 and at block 313 the output module 207 sends, responsive to the status request, a status update to the mobile device 13*a* or 13*b* or user terminal 27.

For example, the failure management platform 200 can provide a status report including an error message to represent the reason for the failure of the non-functional server. The error message may be based on a list of predefined error-codes such that provides information to the client as to what actions the client can take. For example, an error-code may indicate that the failure was due to a retry-able error and the client may be provided an opportunity to re-send the access request to the failure management platform 200. In other instances, the error-code may inform the client that a retry-able error had occurred and that the failure management platform 200 has stored the request and will resend the request to the non-functional server upon the server becoming functional.

Upon determining, at block 303, that the integration server 105 or the application server 31 or 25 is functional, or upon determining, at step 309, that the non-functional server has become functional, at block 315, the output module 207 sends the access request, stored in data store 209, to the integration server 105 or application server 31 or 25. At block 317, the input processing module 201 receives a response to the access request from the integration server 105 and at block 319 the output module 319 sends the response to the mobile device 13a or 13b or user terminal 27.

The failure management platform 200 may automatically receive a failure indicator from a failed server associated with the failure management, prior to sending the request to the integration server 105 or application server 31 or 25. In other instances, the failure management platform 200 may receive the failure indicator from a failed server associated with the failure management, upon sending the request to the integration server 105 or application server 31 or 25. As previously discussed, in such instances, the failure detection module 203 can determine a failure type associated with the failure indicator. The failure type may be determined based on a list of failure types (e.g., error-codes) predefined and stored in data store 209. The list may also include a list of interim-responses (e.g., messages) associated with each failure type. The output module 207 can determine the interim-response associated with the failure type and send the interim-response to the mobile device 13a or 13b or user terminal 27 to inform the user of the failure.

In various instances, for determining whether the integration server 105 or application server 31 or 25 is functional, at blocks 303 or 309, the failure detection module 203 can obtain a predetermined schedule (e.g., a maintenance schedule) associated with the integration server 105 or application server 31 or 25. The predetermined schedule may indicate one or more non-functional periods of time for the integration server 105 or application server 31 or 25. The predetermined schedule may be stored in data store 209. In such instances, the monitoring module 205 can start monitoring the integration server 105 or application server 31 or 25 at the end of the predetermined non-functional periods of time to determine whether the integration server 105 or application server 31 or 25 has become functional.

The access request from the mobile device 13a or 13b or user terminal 27 may be received at the failure management platform 200 via an application server 31 or 25. For example, the application servers 31 can be a Machine-to-Machine (M2M) management server or a Business-to-Business (B2B) server and the mobile device 13a or 13b or user terminal 27 can be a client device registered at the application server 31. In such instances, the mobile device 13a or 13b or user terminal 27 can send the access request for accessing the application server 25 to the application server 31 and the application server 31 sends the request to the application server 25 via the failure management platform 200 and the integration server 105.

In some instances, prior to determining whether the application server 31 or 25 is functional at block 303 or 309, the failure detection module 203 determines whether the access request is valid. For example, the failure detection module 203 can use a set of rules or validity requirements for the requests stored in data store 209 to verify the validity of the access request. The access request may be determined invalid if, for example, the request has an unacceptable format, missing parameters, etc. The failure detection module 203 may send a message to the mobile device 13a or 13b or the user terminal 27 via the output module 207 indicating that the request was invalid and asking the user of the mobile device 13a or 13b or user terminal 27 to send a corrected request.

FIG. 3B is an exemplary process for monitoring a failed server by the failure management server based on a hold process. At block 321, the input processing module 301, of the failure management platform 200 of FIG. 2, receives an access request for an application server 31 or 25 from a mobile device 13a or 13b or a user terminal 27. The input processing module 201 may store the request in data store 209. At block 323, the monitoring module 205 checks, in response to receiving the access request, whether the mobile device 13a or 13b or user terminal 27 is associated with a hold process. A hold process can be a process by the monitoring module 205 determining whether the access request can be sent to the integration server 105 or the application server 31 or 25 or should be held for certain conditions to be met or for a predetermined period of time. Associating a hold process to a mobile device 13a or 13b or a user terminal 27 may include registering the mobile device 13a or 13b or the user terminal 27 at the monitoring module 205 such that the monitoring module 205 can determine, based on the registration, to hold an access request received from the mobile device 13a or 13b or user terminal 27. The process described in FIG. 3B is a failure management process for registered mobile devices 13a or 13b or user terminals 27. If, at block 323, the monitoring module 205 determines that the mobile device 13a or 13b or user terminal 27 is not associated with a hold process (e.g., is not a registered device) the process may end.

In some aspects, if the mobile device 13a or 13b or user terminal 27 is associated with a hold process (e.g., registered at the monitoring module 205), at block 325 the failure detection module 203 determines a value of a hold-flag associated with the integration server 105 or application server 31 or 25. The integration server 105 or application server 31 or 25 may periodically provide the hold-flag as an input to the failure management platform 200. The input processing module 201 may receive the hold-flag and store the value in data store 209. The hold-flag may have an "On" or "Off" value. In addition, the hold-flag may include other data such as a start time, an end time or a duration of a hold. If, at block 325, the value of the hold-flag is determined to be "On", at block 327, the failure detection module 203 assigns a hold-status to the access request. Per block 329, the failure detection module 203 stores the access request and the hold status in the data store 209.

At block 331, the monitoring module 205 starts monitoring the value of the hold-flag until an "Off" value is received from the integration server 105, application server 31 or 25. In some instances, at block 333, the failure management platform 200 may receive one or more status request from the mobile device 13a or 13b or user terminal 27 regarding the status of the access request, during monitoring the hold-flag value. In such instances, at step 335, while the monitoring module 205 is monitoring the hold-flag, the output module 207 may, responsive to the status request, send a status update to the mobile device 13a or 13b or user terminal 27 information the user of the hold status of the request or any additional available data such as the hold duration, the time the hold status is planned to end, etc.

Upon determining, at block 325, that the hold-flag value has been updated, for example by the integration server 105, the application server 31 or 25, at block 337 the output module 207 sends the access request, stored in data store 209, to the integration server 105 or application server 31 or 25. At block 339 the input processing module 201 may receive an error-code from the integration server 105, application server 31 or 25, identifying a failure of the access request.

Upon receiving the error-code, at block 341 the failure detection module 203 determines whether the error-code is a retry-able error-code. The failure detection module 203 may determine a type of the error-code (e.g., retry-able) based on a predefined list of error-codes stored in data store 209. Upon determining that the error-code is a retry-able error-code by the failure detection module 203, the monitoring module 205 can check a value of a retry-counter, for example in data store 209, to determine whether the value is less than a predefined threshold. If the value of the retry-counter is less than the threshold the output module 207 re-sends the access request to the integration server 105, application server 31 or 25. However, if the retry-counter value is higher than the predefined threshold, indicating that the request has been re-sent more than the number of times previously determined, the output module 207 may delay re-sending the access request for a predetermined period of time.

In some instances, the integration server 105 may include multiple servers. For example, the integration server 105 may have a multi-site architecture hosted in multiple locations. In such instances, a mobile device 13a, 13b or user terminal 27 may be configured in each of the multiple hosted locations such that the integration server can provide support to client devices (mobile device 13a, 13b or user terminal 27) in different hosted locations.

In such instances, depending on which host the original access request lands into, a respective location-code can be assigned to that access request. The location-code can be transparent to the client device and when a user of a mobile device 13a or 13b, user terminal 27 sends a status request to the failure management platform 200, the failure management platform 200 determines the respective location-code and re-routs the status request to an appropriate server from the multiple integration servers 105 for processing.

In such instances, if a server from the multiple integration servers 105 is non-functional, the failure management platform 200, transparently from the client device, sends the access request or status request for the non-functional server to another functional server from the multiple integration servers 105.

Figure 4A:
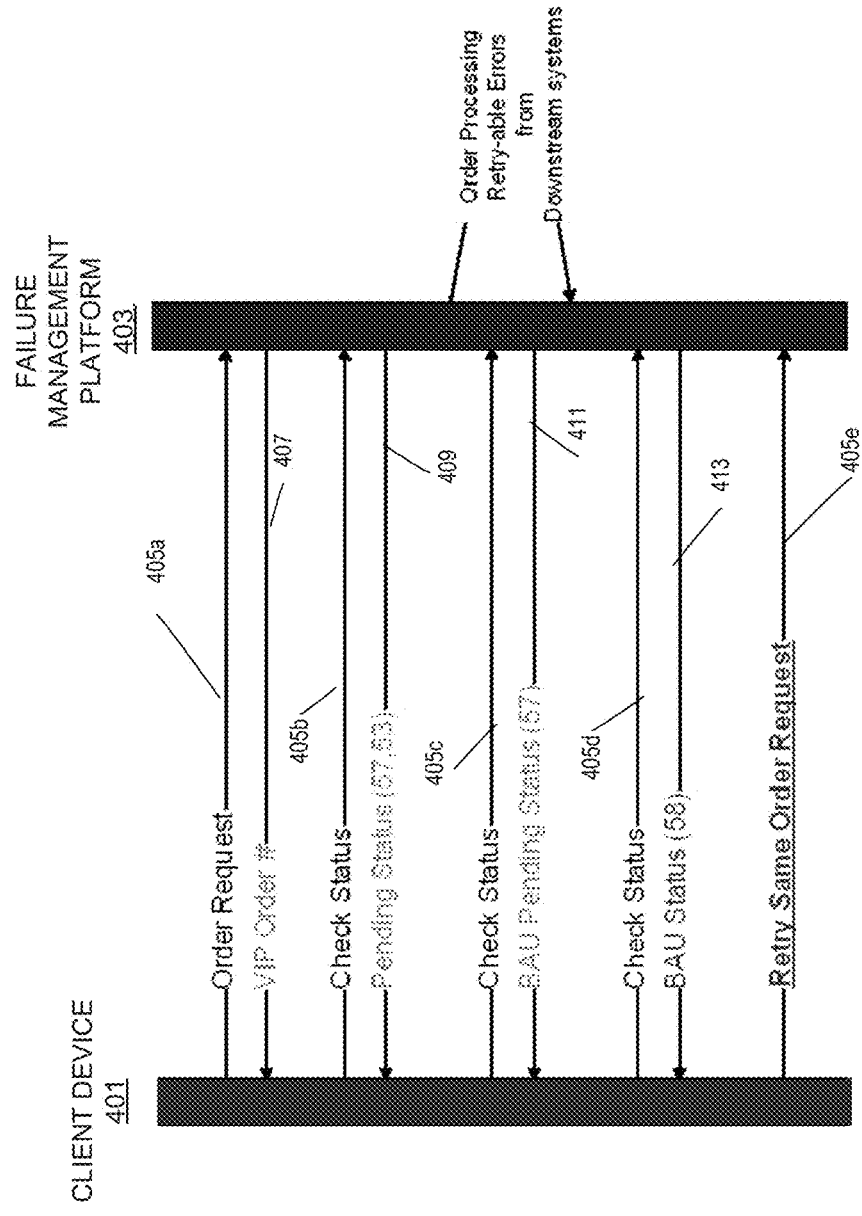
FIGS. 4A-4D are exemplary process flows of communication requests processed by the failure management platform shown in FIG. 2.

FIGS. 4A-4D are exemplary process flows of communication requests processed by the failure management platform shown in FIG. 2. In FIG. 4A, in step 405a the client device 401 (similar to the mobile device 13a or 13b or user terminal 27) sends an access request for an integration server 105 or application server 31 or 25 (not shown in FIG. 4A) to the failure management platform 403 (similar to the failure management platform 200 of FIG. 2) for processing. The failure management platform 403 may responds to the client device 401 with an order number, per step 407, for each access request. In addition, the client device 401 may send a status request, per step 405b, to the failure management platform 403 using the order number received in step 407. Depending upon the outcome of processing of the access request, the failure management platform 403 responds to the client device 401 with an error, a success or in-processing status, per step 409.

Subsequent to step 409, the request may go through to the server. In such instances, if the client device 401 checks the status again in step 405c, the failure management platform 403 may send a response 411 and inform the user that the request has gone through to the server. However, upon sending the response 411, the failure management platform 403 may receive an error status from the server identifying a retry-able error. The client device 401 may continue checking the status, for example, in predefined intervals. For example, the client device 401 may check the status one more time at step 405d and receive a response 413 informing the user of the retry-able error. In such case, the client device can send request 405e by retrying the initial request sent in step 405a.

In instances when there is either a planned downtime or an outage on the integration server 105 or application server 31 or 25, the access requests result in errors. If these errors are communicated back to the client device 401 and clients retry sending the requests again, this can cause the repetition of entire request processing flow.

The access requests can be processed by the integration server 105 or by the application servers 31 or 25 in various ways. Access requests such as, for example service activation and service updates can be processed by the integration server 105. The failures that can happen in such instances may include, for example, connectivity errors, where the integration server 105 is unable to communicate with downstream applications servers 31 or 25, or application errors, where the application servers 31 or 25 return error-codes indicating retry-able failures. In other instances, the access requests can be processed by the application server 31 or 25. For example, the application server 31 or 25 may fail while processing a billing requests associated with a service provided by the application server 31 or 25. In this scenario, a failure can be a planned downtime, where the application server 31 or 25 is scheduled to be unavailable for certain duration of time due to any maintenance activities, or an unplanned downtime, where the application server 31 or 25 returns an error due to any system failures. In addition, the failure can be a retry-able error due to temporary unavailability of some resources. Other failure situations may arise, for example, when the integration server 105 is down for maintenance. In this case the client device 401 may receive a failure notification from the integration server 105 in response to an access request or to a status request.

Figure 4B:
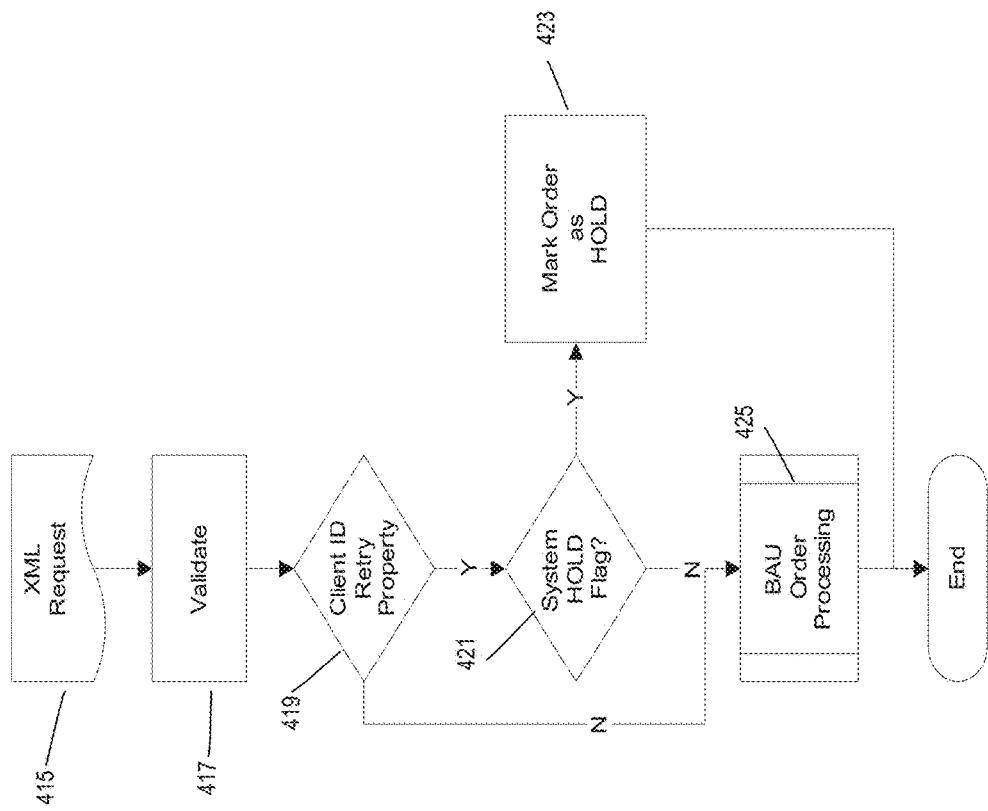

FIG. 4B shows an exemplary process flow of processing an access request. At block 415 an access request is received at the failure management platform 403 of FIG. 4A (200 in FIG. 2). Upon receipt of the request, at block 417, basic validation is performed by the input processing module 201. At block 419 a check can be performed to determine whether the client who is sending the access request is interested in a hold process, as discussed with regards to FIG. 3B. If not, the order is processed, at block 425. If the client is interested in the hold process, a hold-flag is checked by the monitoring module 205. The hold-flag is an indicator of the status/health of the integration server 105 or the application servers 31 or 25. If a planned downtime is observed for any of the servers, the hold-flag is set to "On". At block 421, if the hold-flag is "On", meaning that some server is unavailable, at block 423 the current access request, being processed, is marked as hold. And the processing is suspended for this access request. However, if the hold-flag is "Off", meaning all the servers are functional; the order is processed per block 425.

Figure 4C:
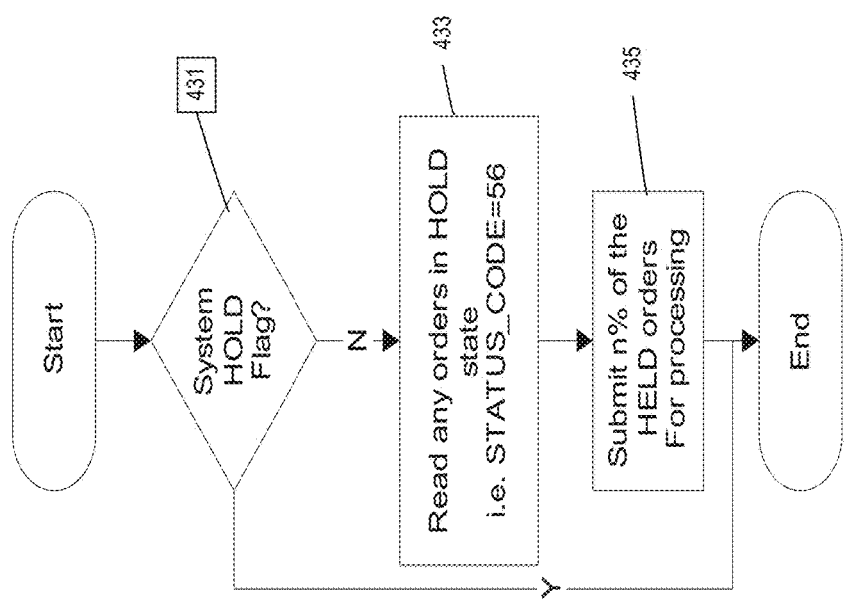

FIG. 4C is an exemplary process flow of a process of a held access request. The process of an access request that has been put on hold, as described with regards to FIG. 4B, can be processed at intervals via a scheduler. For example, at block 431 the monitoring module 205 can check whether the hold-flag is reset to "On" (i.e. the servers 105, 31 or 25 are functional). In case any of the servers is still unavailable, the process ends. However, if the servers are functional, per block 433 the monitoring module 205 reads and processes the access requests that have been associated with the hold-flag. In order to avoid overwhelming the servers with the request load, at block 435 the output module 207 may throttle processing of the held access requests, for example, by dividing the requests into smaller sets each set including a percentage of the total number of requests and sending the smaller sets to the integration server 105 or the application server 31 or 25. The percentage of request within each set may be determined based on a predefined level, based on a current number of held requests, based on a number of functional servers, or a combination thereof.

Figure 4D:
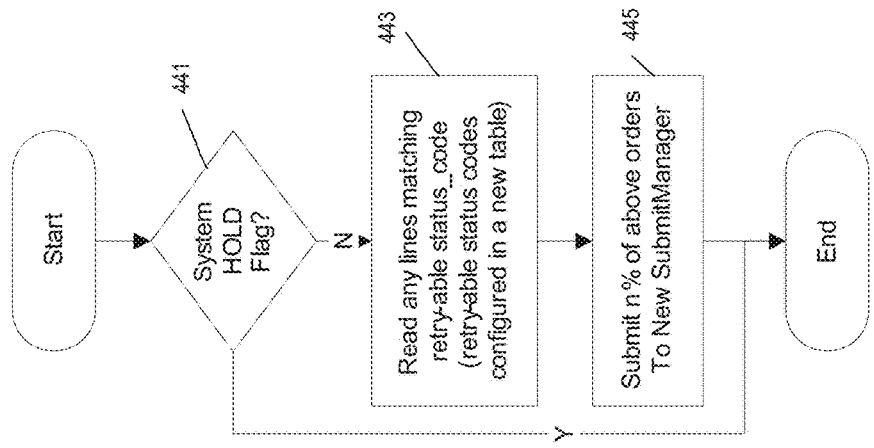

FIG. 4D is an exemplary process flow of retrying a failed access request due to a retry-able error. An error-code associated with the retry-able error is used to identify requests associated with the retry-able errors. The failure detection module 203 can match the error-codes against a list of retry-able error-codes maintained in the data store 209. At block 441, the monitoring module 205 checks the hold to ensure that application servers 31 or 25 are functional and available to process requests from the integration server 105. If the servers are available, at block 443, the monitoring module 205 identifies retry-able access requests and in block 445 submits the identified requests to the integration server 105 to be sent to the application servers 31 or 25 for reprocessing.

Prior to submitting the requests, the output module 207 may increment a counter as a retry-counter, as discussed in FIG. 3B (block 343). The maximum retry number can be a configurable parameter. If the retry counter on any request exceeds the maximum retry attempts, respective request can be marked as error and may not be retried anymore.

Similarly, as discussed with regards to FIG. 4C, at step 445, the output module 207 may throttle processing of the held access requests, for example, by dividing the requests into smaller sets each set including a percentage of the total number of requests and sending the smaller sets to the integration server 105 or the application server 31 or 25.

Figure 5A:
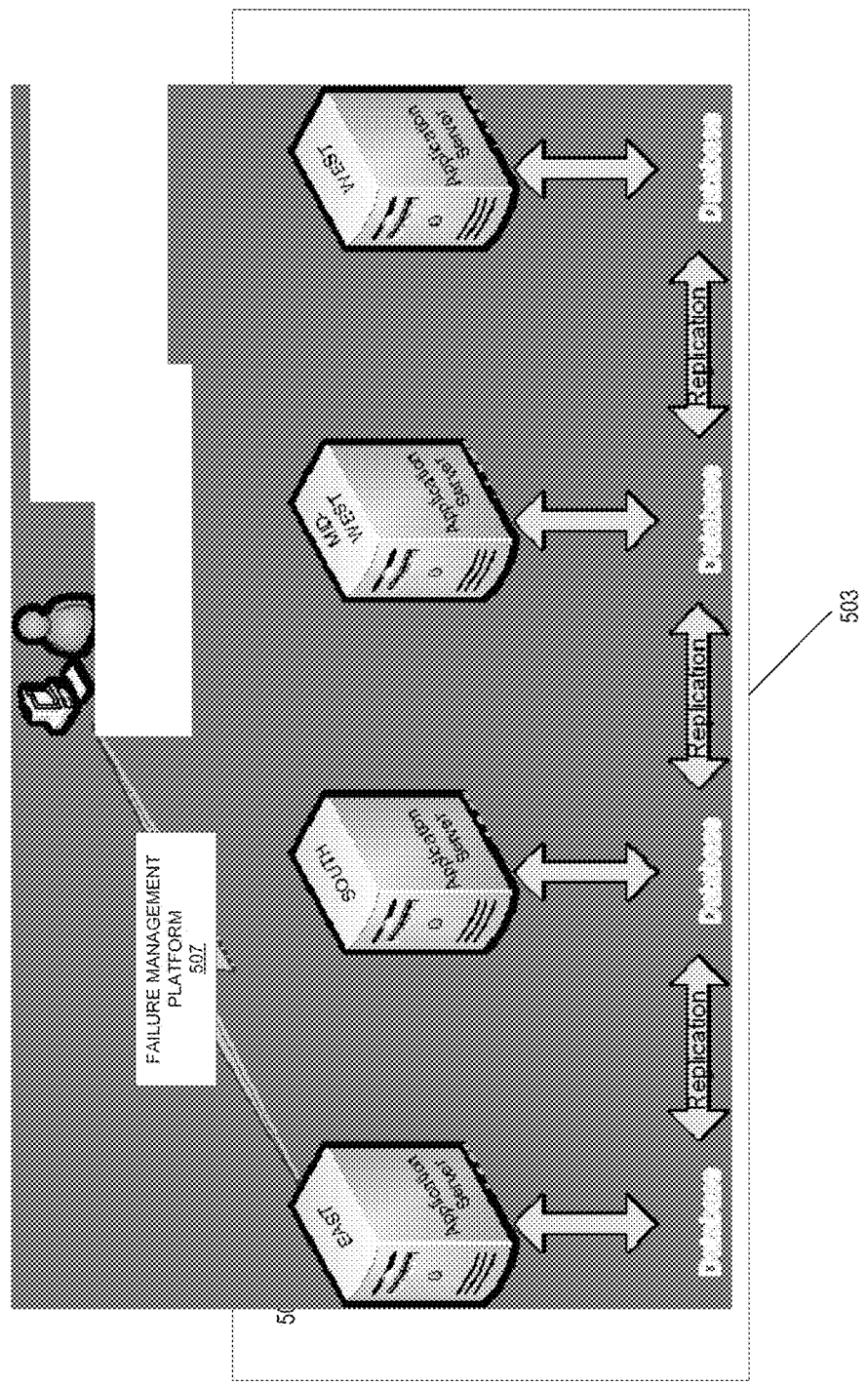
FIGS. 5A-5B are exemplary high-level block diagrams of a failure scenario managed by the failure management platform shown in FIG. 2.
Figure 5B:
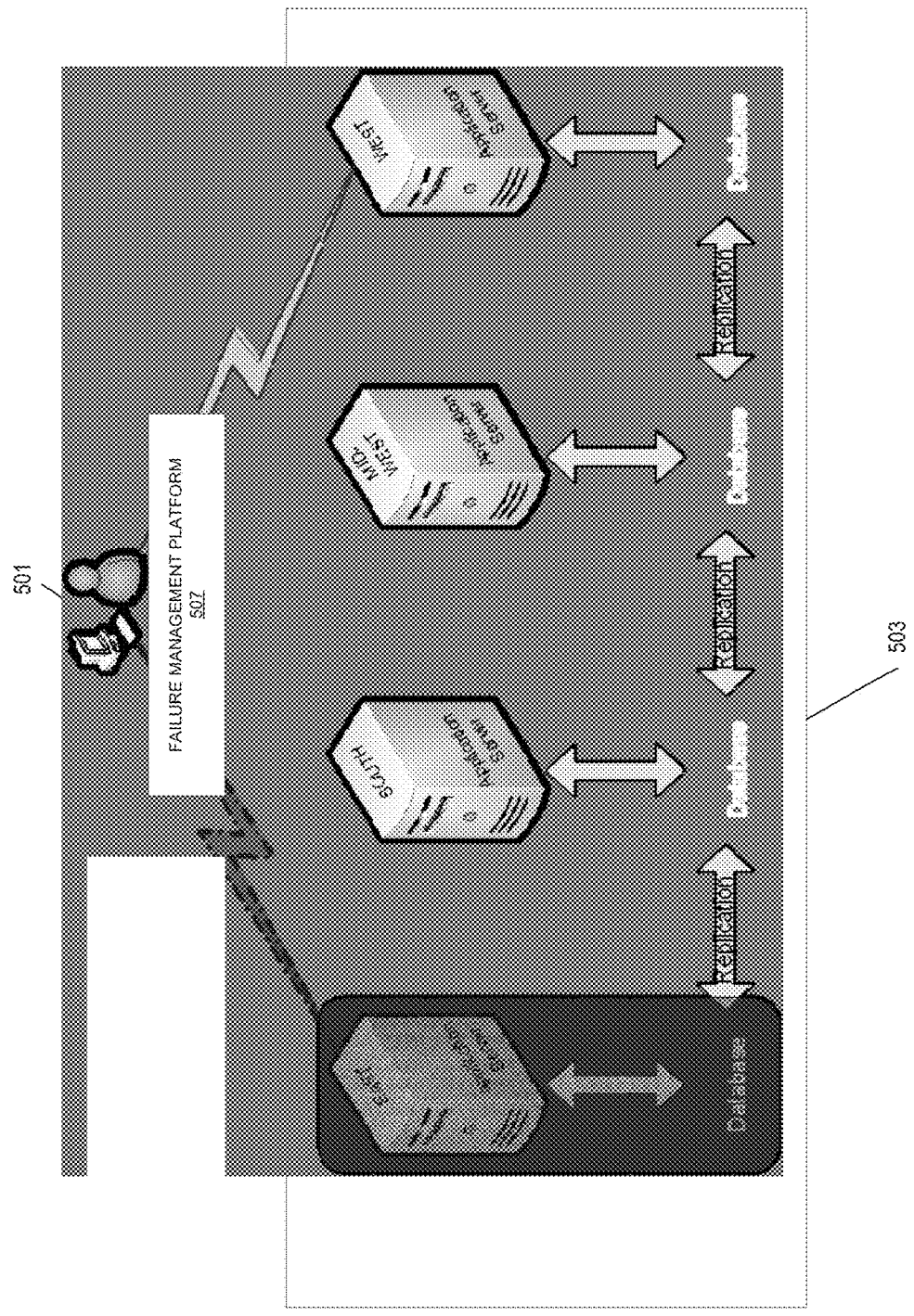

FIGS. 5A-5B are exemplary high-level block diagrams of a failure scenario managed by the failure management platform shown in FIG. 2. FIG. 5A shows a scenario where a server 503, similar to the integration server 105 or the application server 31 or 25 of FIG. 1, includes multiple servers 505a-505c. The servers 505a-505b communicate via the communication network 15 such that each server 505a-505d is a replication of the other servers 505a-505d. In FIG. 5A, the integration server 503 has a multi-site architecture which means it is hosted in multiple locations. Each client device 501 (similar to the mobile device 13a or 13b or user terminal 27) is configured in each of the hosted locations 505a-505d such that each hosted location 505a-505d includes a copy of the profile and identification data for the mobile device 13a or 13b or user terminal 27. The setup as shown in FIG. 5A supports processing access requests from any client device 501 in any of the hosted locations 505a-505d.

Depending on which host receives the original access request, a respective location-code is assigned to the access request by the failure management platform 507 (similar to failure management platform 200 of FIG. 2). This location-code is transparent to the client device 501. When a client (a used of the client device 501) sends a status request to the failure management platform 507, the failure management platform 507 determines the respective location-code and re-routes the access request to appropriate host 505a-505d for processing.

The failure management platform 507 can also manage a situation when one of the hosts 505a-505d is non-functional. As shown in FIG. 5B, where one of the servers 505a-505d becomes unavailable (e.g. 505a in FIG. 5B) the access request is transparently sent to another active host 505b-505d by the failure management platform 507. Due to the active configuration setup for every client devices 501 on each of the servers 505a-505d, the original access request is processed on another server 505b-505d with a different location-code than the unavailable server 505a. This change in location-code remains transparent from the client device 501. Similarly, when the client device 501 sends a status request for such a re-routed access request, the failure management platform 507 routes that status request to the appropriate server 505b-505d to query the status of the respective access request. For example, the access requests coming from the client device 501 may be sent to the server 505a, by default. In normal situations and in the absence of any failure, the access request is processed on the server 505a-505d where it has been received.

Replication among the servers 505a-505d may be performed by the failure management platform 507 at database layer of each server 505a-505d to ensure availability/integrity of access requests and reference data associated with the access requests in the servers/clusters 505a-505d. Thus, the access requests from a client device 501 created in any of servers 505a-505d are available in every server 505a-505d.

In the event of server 505a failure, shown in FIG. 5B, the traffic is transparently routed to an available server 505b, 505c, or 505d. As the reference data is already setup for client device 501 in every server 505a-505d, the access requests can be successfully processed on any of the servers 505b-505d.

As a result of replication of data in servers 505a-505d, the access request data is also present in servers 505b-505d. Therefore, even if prior to the failure the access request was received in server 505a, data associated with the request is present in servers 505b-505d databases and when the client wants to query the old access requests, they can be retrieved from any of the servers 505a-505d. Thus it provides high availability.

Figure 6:
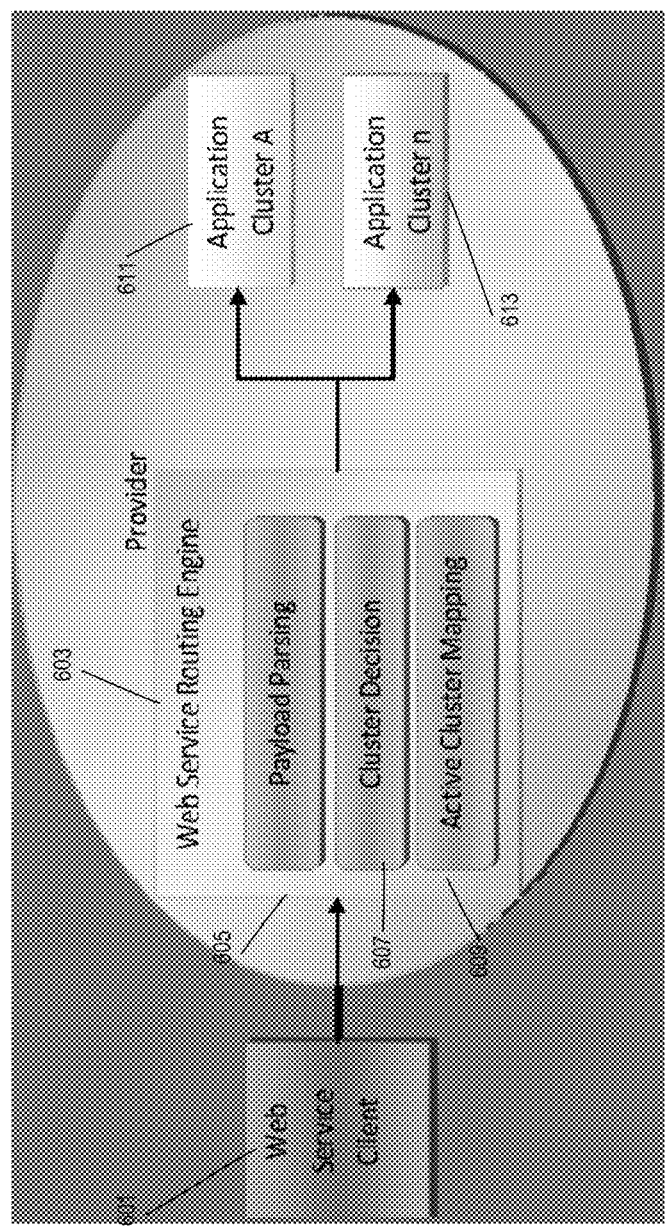
FIG. 6 is a high-level functional block diagram showing a message flow via the failure management platform shown in FIG. 2.

FIG. 6 is an exemplary functional block diagram showing a message flow via the failure management platform shown in FIG. 2. A client device 601, which in this example is a web service client, similar to mobile device 13a or 13b or user terminal 27, sends an access request via a URL to the web service routing engine 603 (similar to integration server 105 and the failure management platform 103). The web service routing engine 603 receives the access request. The payload parsing 605 parses the access request to decide possible data elements that can be used in routing the request to an application server 611 or 613 (similar to application servers 31 or 25 of FIG. 1). For example, the payload parsing 605 may determine data elements including an intended server for the request, parameters associated with the request such as request type, requesting user's credentials, etc. The web service routing engine 603 may also apply a set of rules on the access request to determine an order of evaluating data elements associated with the access request based on the payload and a designated endpoint. The rules may include rules related to the syntax and/or semantics of a language (e.g., a query language) that is used for creating the request. The rules may also include instructions that guide the web service routing engine 603 in interpreting the request and extracting the data elements from the request. The data elements extracted from the request can be evaluated by the cluster decision 607 to decide the intended application server among servers 611 to 613. Subsequently, once the intended server is determined, the intended server is compared to a mapping of the active servers, provided by the active cluster mapping 609, for the intended server. The access request is sent to an active server among servers 611 to 613. The active server receiving the request responds to the routing engine based on the request and the response is sent to the client device 601 by the web service routing engine 603.

Those skilled in the art presumably are familiar with the structure, programming and operations of the various types of mobile devices. However, for completeness, it may be useful to consider the functional elements/aspects of two exemplary mobile devices 13a and 13b, at a high-level.

Figure 7:
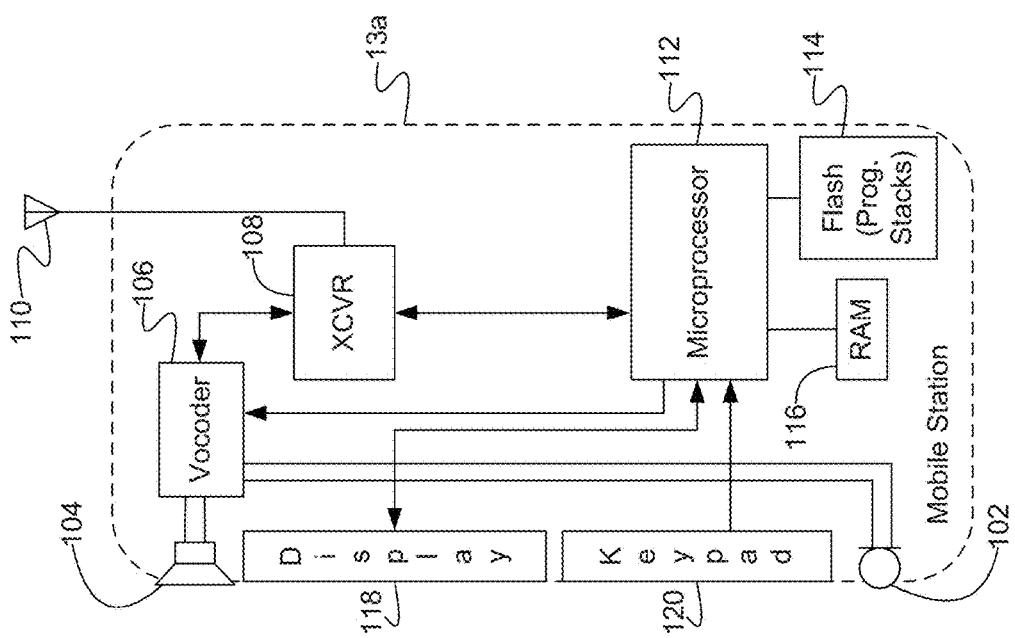
FIG. 7 is a high-level functional block diagram of an exemplary non-touch type mobile device that may utilize the failure management service through a network/system like that shown in FIG. 1.

For purposes of such a discussion, FIG. 7 is a high-level functional block diagram of an exemplary non-touch type mobile device that may utilize the failure management service through a network/system like that shown in FIG. 1.

FIG. 7 provides a block diagram illustration of an exemplary non-touch type mobile device 13a. Although the mobile device 13a may be a smart-phone or may be incorporated into another device, such as a personal digital assistant (PDA) or the like, for discussion purposes, the illustration shows the mobile device 13a is in the form of a handset. The handset implementation of the mobile device 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass implementations of the mobile device 13a utilizing any digital transceivers that conform to current or future developed digital wireless communication standards. The mobile device 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile device 13a includes a display 118 for displaying messages, menus or the like; call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during failure management process. For example, if used for failure management provided by a failure management platform 200 or requesting the failure management service to applications.

A microprocessor 112 serves as a programmable controller for the mobile device 13a, in that it controls all operations of the mobile device 13a in accord with programming that it executes, for all normal operations, and for operations involved in the failure management procedure under consideration here. In the example, the mobile device 13a includes flash type program memory 114, for storage of various "software" or "firmware" program routines and mobile configuration settings, such as mobile directory number (MDN) and/or mobile identification number (MIN), etc. The mobile device 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile device 13a includes a processor, and programming stored in the flash memory 114 configures the processor so that the mobile device is capable of performing various desired functions, including in this case the functions involved in the technique for providing failure management services. For example, any of the modules of the failure management platform 200 or any parts of the modules can be located on the mobile device 13a or 13b.

Figure 8:
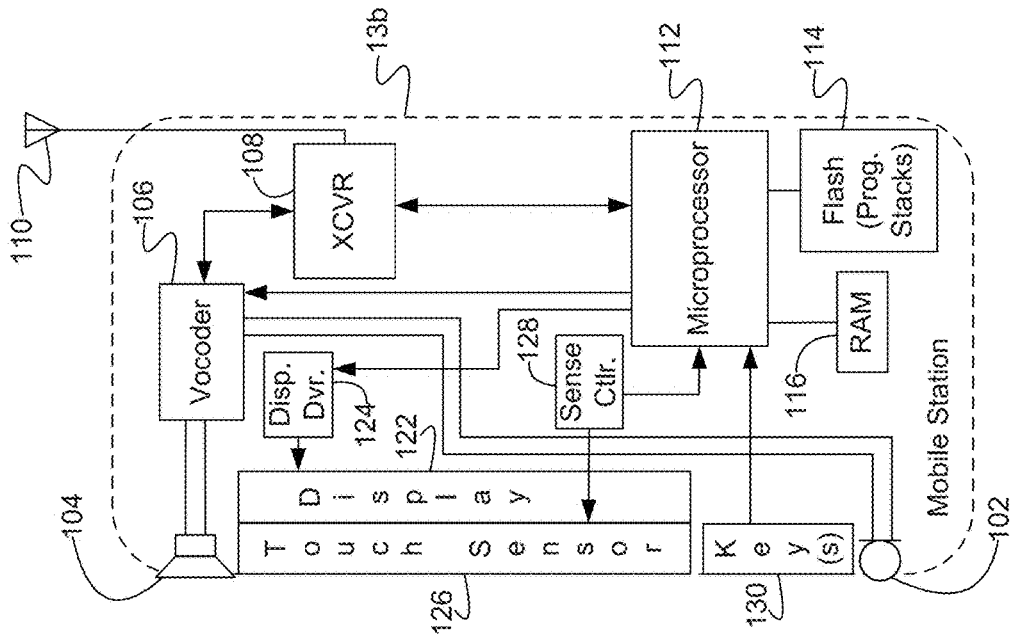
FIG. 8 is a high-level functional block diagram of an exemplary touch screen type mobile device that may utilize the failure management service through a network/system like that shown in FIG. 1.

For purposes of such a discussion, FIG. 8 provides a high-level functional block diagram of an exemplary touch screen type mobile device that may utilize the failure management service through a network/system like that shown in FIG. 1. FIG. 8 provides a block diagram illustration of an exemplary touch screen type mobile device 13b. Although possible configured somewhat differently, at least logically, a number of the elements of the exemplary touch screen type mobile device 13b are similar to the elements of mobile device 13a, and are identified by like reference numbers in FIG. 8. For example, the touch screen type mobile device 13b includes a microphone 102, speaker 104 and vocoder 106, for audio input and output functions, much like in the earlier example. The mobile device 13b also includes at least one digital transceiver (XCVR) 108, for digital wireless communications, although the handset 13b may include an additional digital or analog transceiver. The concepts discussed here encompass implementations of the mobile device 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile device 13b, in that it controls all operations of the mobile device 13b in accord with programming that it executes, for all normal operations, and for operations involved in the failure management procedure under consideration here. In the example, the mobile device 13b includes flash type program memory 114, for storage of various program routines and mobile configuration settings. The mobile device 13b may also include a non-volatile random access memory (RAM) 116 for a working data processing memory. Of course, other storage devices or configurations may be added to or substituted for those in the example. Hence, outlined above, the mobile device 13b includes a processor, and programming stored in the flash memory 114 configures the processor so that the mobile device is capable of performing various desired functions, including in this case the functions involved in the technique for providing failure management service.

In the example of FIG. 7, the user interface elements included a display and a keypad. The mobile device 13b may have a limited number of key 130, but the user interface functions of the display and keypad are replaced by a touch screen display arrangement. At a high level, a touch screen display is a device that displays information to a user and can detect occurrence and location of a touch on the area of the display. The touch may be an actual touch of the display device with a finger, stylus or other object, although at least some touch screens can also sense when the object is in close proximity to the screen. Use of a touch screen display as part of the user interface allows a user to interact directly with the information presented on the display.

Hence, the exemplary mobile device 13b includes a display 122, which the microprocessor 112 controls via a display driver 124, to present visible outputs to the device user. The mobile device 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 13b. The microphone 102 and speaker 104 may be used as additional user interface elements, for audio input and output, including with respect to some failure management related functions.

The structure and operation of the mobile devices 13a and 13b, as outlined above, were described by way of example, only. As shown by the above discussion, functions relating to the failure management service, via a graphical user interface of a mobile device may be implemented on computers connected for data communication via the components of a packet data network, operating as shown in FIG. 1. Although special purpose devices may be used, such devices also may be implemented using one or more hardware platforms intended to represent a general class of data processing device commonly used to run "server" programming so as to implement the failure management functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for failure management service. The software code is executable by the general-purpose computer that functions as the failure management platform and/or that functions as a user terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for failure management service, in essentially the manner performed in the implementations discussed and illustrated herein.

FIGS. 9 and 10 provide functional block diagram illustrations of general purpose computer hardware platforms. FIG. 9 illustrates a network or host computer platform, as may typically be used to implement a server. FIG. 10 depicts a computer with user interface elements, as may be used to implement a personal computer or other type of work station or terminal device, although the computer of FIG. 10 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 9). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of providing failure management services outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the failure management platform 200 into the computer platform of the application server 25 that will be the application server for the mobile devices 13a, and 13b or the user terminal 27. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the failure management service, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

While the above discussion primarily refers to processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

Many of the above described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions.

In this specification, the term "software" is meant to include firmware residing in read-only memory or applications stored in magnetic storage, which can be read into memory for processing by a processor. Also, in some implementations, multiple software operations can be implemented as sub-parts of a larger program while remaining distinct software operations. In some implementations, multiple software operations can also be implemented as separate programs. Finally, any combination of separate programs that together implement a software invention described herein is within the scope of the invention. In some implementations, the software programs, when installed to operate on one or more electronic systems, define one or more specific machine implementations that execute and perform the operations of the software programs.

A computer program (also known as a program, software, software application, script, application, or code) can be written in any form of programming language, including compiled or interpreted language, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of steps in the processes disclosed herein is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The implementations described hereinabove are further intended to explain and enable others skilled in the art to utilize the invention in such, or other, implementations and with the various modifications required by the particular applications or uses of the invention. Accordingly, the description is not intended to limit the invention to the form disclosed herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A method comprising:
   receiving, at a first server and from a client device, an access request for a second server;
   responsive to receiving the access request, determining, by the first server, whether the second server is functional;
   upon determining the second server is non-functional:
      storing, by the first server, the access request in a storage associated with the first server,
      monitoring, by the first server, the second server until the second server becomes functional,
      during the monitoring step, receiving at the first server a status request from the client device, and
      responsive to the status request, sending a status update to the client device during the monitoring step and prior to the second server becoming functional.

2. The method of claim 1, wherein monitoring the second server comprises:
   prior to sending, by the first server, the access request to the second server, automatically receiving, at the first server, a failure indicator from the second server;
   determining, by the first server, a failure type associated with the failure indicator;
   determining, by the first server, an interim-response to the access request, at least based on the failure type; and
   sending, by the first server, the interim-response to the client device.

3. The method of claim 2, wherein:
   when the first server is a back-end server, the failure type is a connectivity failure, an application failure, or a combination thereof; and
   when the first server is a front-end server, the failure type is a planned downtime, an unplanned downtime, a retry-able failure, or a combination thereof.

4. The method of claim 1, further comprising:
   upon sending, by the first server, the access request to the second server, receiving, at the first server, one or more failure indicators indicating one or more failures associated with the second server for responding to the access request;
   determining, by the first server, a failure type associated with each failure indicator;
   determining, by the first server, an interim-response to the access request, at least based on the failure types; and
   sending, by the first server, the interim-response to the client device.

5. The method of claim 1, wherein:

determining whether the second server is functional comprises obtaining, by the first server, a predetermined schedule associated with the second server, the predetermined schedule indicating one or more non-functional periods of time for the second server, and monitoring the second server by the first server comprises determining, by the first server, an end of one of the one or more non-functional periods of time.

6. The method of claim 1, further comprising:
prior to determining whether the second server is functional, determining, by the first server, validity of the access request based on a set of predefined validity requirements.

7. The method of claim 1, further comprising:
determining that the second server has become functional, after being non-functional;
sending, by the first server, the access request to the second server;
receiving, at the first server, a response to the access request from the second server; and
sending, by the first server, the response to the client device.

8. A management server comprising:
a processing device; and
a memory storing executable instructions for causing the processing device to:
receive, at a first server and from a client device, an access request for a second server;
responsive to receiving the access request, determine, by the first server, whether the second server is functional; and
upon determining the second server is non-functional:
store, by the first server, the access request in a storage associated with the first server,
monitor, by the first server, the second server until the second server becomes functional,
during the monitoring, receive at the first server a status request from the client device, and
responsive to the status request, send a status update to the client device during the monitoring and prior to the second server becoming functional.

9. The management server of claim 8, wherein the instructions for causing the processing device to monitor the second server further cause the processing device to:
prior to sending, by the first server, the access request to the second server, automatically receive, at the first server, a failure indicator from the second server;
determine, by the first server, a failure type associated with the failure indicator;
determine, by the first server, an interim-response to the access request, at least based on the failure type; and
send, by the first server, the interim-response to the client device.

10. The management server of claim 9, wherein:
(i) the first server is a back-end server, and the failure type is a connectivity failure, an application failure, or a combination thereof, or
(ii) the first server is a front-end server, and the failure type is a planned downtime, an unplanned downtime, a retry-able failure, or a combination thereof.

11. The management server of claim 8, wherein the instructions further cause the processing device to:
send, by the first server, the access request to the second server;
upon sending, by the first server, the access request to the second server, receive, at the first server, one or more failure indicators indicating one or more failures associated with the second server for responding to the access request;
determine, by the first server, a failure type associated with each failure indicator;
determine, by the first server, an interim-response to the access request, at least based on the failure types; and
send, by the first server, the interim-response to the client device.

12. The management server of claim 8, wherein:
the instruction for causing the processing device to determine whether the second server is functional comprises obtaining, by the first server, a predetermined schedule associated with the second server, the predetermined schedule indicating one or more non-functional periods of time for the second server, and
the instruction for causing the processing device to monitor the second server by the first server comprises determining, by the first server, an end of one of the one or more non-functional periods of time.

13. The management server of claim 8, wherein the access request is received via a Machine to Machine (M2M) management server, a Business to Business (B2B) server, or a combination thereof.

14. The management server of claim 8, wherein the instructions further cause the processing device to:
prior to determining whether the second server is functional, determine, by the first server, validity of the access request based on a set of predefined validity requirements.

15. The management server of claim 8, wherein the instructions further cause the processing device to:
determine that the second server has become functional, after being non-functional;
send, by the first server, the access request to the second server;
receive, at the first server, a response to the access request from the second server; and
send, by the first server, the response to the client device.

16. A management server comprising:
a processing device; and
a memory storing executable instructions for causing the processing device to:
receive, at a first server and from a client device, an access request for a second server, wherein the client device is associated with a hold process;
responsive to receiving the access request, determine, by the first server, a hold-flag value associated with the second server;
upon determining the hold-flag value is "On":
assign, by the first server, a hold-status to the access request,
store, by the first server, the access request in a storage associated with the first server,
monitor, by the first server, the hold-flag, until the hold-flag value is "Off",
during the monitoring, receive at the first server a status request from the client device, and
responsive to the status request, send a status update to the client device during the monitoring.

17. The management server of claim 16, wherein the first server comprises a plurality of servers, and wherein the client device is associated with a third server from the plurality of servers, the instructions further cause the processing device to:

replicate data associated with each server from the plurality of servers into other servers from the plurality of servers;

upon receiving the access request from the client device, at the third server, and receiving a failure status associated with the third server, wherein the failure status indicates that the third server is non-functional, determine a fourth server from the plurality of servers, wherein the fourth server is functional;

redirect, transparently from the client device, the access request to the fourth server, wherein the fourth server determines the hold-flag value associated with the second server based on the replicated data, and redirect further access requests associated with the third server to the fourth server, until the third server becomes functional.

18. The management server of claim 16, wherein the client device being associated with the hold process comprises registering the client device at the first server prior to receiving the access request from the client device.

19. The management server of claim 16, wherein the instructions further cause the processing device to:

determine that the hold-flag value is "Off", after being "On";

send, by the first server, the access request to the second server;

upon sending the access request to the second server, receive an error-code identifying a failure associated with the access request;

determine, by the first server, whether the error-code is a retry-able error-code, based on a predefined list of error-codes; and upon determining the error-code is a retry-able error-code, and a retry-counter is less than a predefined threshold, re-send the access request, by the first server, to the second server.

* * * * *